United States Patent
Laslandes et al.

(10) Patent No.: US 9,097,886 B2
(45) Date of Patent: Aug. 4, 2015

(54) CORRECTION DEVICE OF AT LEAST ONE ABERRATION OF KNOWN EVOLUTION WITH DEFORMABLE MIRROR

(75) Inventors: Marie Laslandes, Marseilles (FR); Marc Ferrari, Marseilles (FR); Emmanuel Hugot, Marseilles (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 28 days.

(21) Appl. No.: 13/450,385

(22) Filed: Apr. 18, 2012

(65) Prior Publication Data
US 2012/0275041 A1 Nov. 1, 2012

(30) Foreign Application Priority Data
Apr. 19, 2011 (FR) .................................... 11 53390

(51) Int. Cl.
*G02B 5/08* (2006.01)
*G02B 7/182* (2006.01)
*G02B 27/00* (2006.01)
*G02B 26/08* (2006.01)

(52) U.S. Cl.
CPC ........ *G02B 27/0025* (2013.01); *G02B 26/0825* (2013.01); *G02B 27/0068* (2013.01)

(58) Field of Classification Search
CPC ...... G02B 26/06; G02B 26/0825; G02B 5/08; G02B 5/10; G02B 7/183
USPC ................. 359/846.848, 318, 290, 291, 578
See application file for complete search history.

(56) References Cited

U.S. PATENT DOCUMENTS

| | | | |
|---|---|---|---|
| 2006/0082909 A1* | 4/2006 | Griffith et al. | 359/871 |
| 2007/0165312 A1* | 7/2007 | Aoki et al. | 359/846 |
| 2007/0229993 A1 | 10/2007 | Hemmati et al. | |
| 2007/0268592 A1 | 11/2007 | Kam et al. | |

FOREIGN PATENT DOCUMENTS

| | | | | |
|---|---|---|---|---|
| WO | WO 2009/097503 A1 | 8/2009 | | |
| WO | WO 2009097503 A1 * | 8/2009 | ............. | G02B 27/00 |

* cited by examiner

*Primary Examiner* — Thomas K Pham
*Assistant Examiner* — Sharrief Broome
(74) *Attorney, Agent, or Firm* — Blakely Sokoloff Taylor & Zafman (57) ABSTRACT

The invention relates to a device for correcting at least one optical aberration, of known evolution of an optical system, the device comprising: a deformable mirror (1) having a contour; means (2) for deforming the mirror; characterized in that the mirror (1) has a geometry selected such that the contour of the mirror (1) is defined from a composite function of said at least one aberration and in that the means (2) for deforming the mirror are adapted to apply a flexing moment on the edges of the mirror, the deformable mirror being concave or convex when it is deformed.

8 Claims, 5 Drawing Sheets

CORRECTION DEVICE OF AT LEAST ONE ABERRATION OF KNOWN EVOLUTION WITH DEFORMABLE MIRROR

GENERAL TECHNICAL FIELD

The invention relates to the field of active optics and more particularly a device for correcting aberrations in an optical system by means of a deformable mirror.

PRIOR ART

In active optics, active mirrors are used to compensate the aberrations appearing in an optical instrument and limiting its performance. In fact, the quality of the images obtained by an optical instrument is degraded due to perturbations on the trajectory of the wave originating from the object observed.

Aberrations corrected by the active optical come from the instrument itself: configuration of the elements in relation to each other (optical path difference or angle of incidence for example), imperfect form of optics, deformations of optical surfaces under their own weight or by thermal dilation.

Compensation systems have been developed to dispense with such defects.

As are known, these systems comprise a deformable mirror whereof the deformation is controlled as a function of aberrations present in the instrument. The different technologies used are the following: deformable mirror adjusted with piezoelectric actuators positioned under the surface of the mirror, mirror deformed by magnetic pistons, electro-mechanical micro-mirror, amplitude modulator or liquid mirror.

The most used deformation systems bring into play actuators, integrated between the surface of the mirror and a support plate. A measuring instrument analyses the deformation of the wavefront and sends a command to the actuators which will apply a shift under the optical surface for correcting the wavefront.

The major problems of this technique come from the locating of the actuators directly under the optical surface.

First, the act of pressing directly under the mirror is going to generate high-frequency defects (imprint effects).

Second, the precision of the deformation is directly associated with the number of actuators: sufficient sampling relative to the preferred deformation is required.

Therefore, the larger the surface of the mirror, the more actuators are required, but the actuator density is limited by their bulk.

To prevent the appearance of high-frequency defects, mirror deformation systems have been designed so as to apply forces and moments about the optical surface. In such a case, the number of actuators no longer depends on the size of the mirror, only on the aberrations to be corrected. It is also possible to apply pressure under the surface, and the deformation will be continued.

All these correction systems can be complex to operate: control of actuators and numerous mechanical pieces.

Also, mirror deformation systems used for active correction of wavefront can also be used for making aspherical mirrors by polishing under constraints.

In fact, an aspherical mirror is constituted by a sphere (easily made) plus a combination of optical aberrations. Polishing under constraints consists of deforming a mirror according to the final preferred shape, polishing it spherical with a full-size tool (to prevent high-frequency defects) then releasing the constraints: the mirror will now assume the preferred aspherical shape. This technique creates aspherical surfaces (for example off-axis parabolas) of excellent quality.

There is a need here to simplify deformation systems to in turn simplify the use of polishing under constraint (especially if the deformation system is constituted by few mechanical pieces).

So in light of the problems identified above deformable mirrors used currently for correcting optical aberrations comprise a significant number of actuators which complicates using the systems and application of forces directly on the optical surface which generate defects of higher orders.

PRESENTATION OF THE INVENTION

The invention eliminates the above disadvantages.

Therefore, according to a first aspect, the invention relates to a device for correcting at least one optical aberration, of known evolution, of an optical system, the device comprising:
   a deformable mirror having a contour;
   means for deforming the mirror, preferably by application of mechanical moments to its edges by means of a single actuator.

The device is characterised in that the mirror has a geometry selected such that the contour of the mirror is defined from a composite function of said at least one aberration and in that the system of mechanical deformation is adapted to apply the necessary flexing moment on the edges of the mirror, the deformable mirror being concave or convex when it is deformed.

Due to knowing about aberrations to be corrected in the optical system, it is possible to select a particular geometry of the system adapted to the correction of these aberrations.

Also, it is possible only by application of a force to generate a flexing moment at the edges of the mirror to correct these aberrations.

Other aspects of the device are the following:
   the means for deforming the mirror comprise at least one single actuator;
   the composite function is defined in a position in cylindrical coordinates $F_O=(O, \vec{x}_O, \vec{jy}_O, \vec{z}_O)$ attached to the mirror, of origin O the centre of symmetry of the mirror and with $\vec{z}_O$ a vector parallel to the optical axis of the mirror, the contour being such that the composite function is zero according to the axis z;
   the contour is selected from the following group: circular if the composite function is composed by a focus; elliptical if the composite function is composed by a focus and an astigmatism; a form defined by the resolution of the composite function composed by a focus and one or more other aberrations;
   the means for deforming the mirror comprise an intermediate plate having a contour identical to that of the mirror; a single actuator applying a force F of given intensity on the intermediate plate; a ring placed above the intermediate plate, the mirror being placed on the ring;
   the single actuator is positioned to apply the force F at the centre of the intermediate plate;
   the deformable mirror is of variable thickness;
   the intermediate plate has an edge of variable thickness;
   the mirror is constituted by glass and/or metal.

According to a second aspect, the invention relates to an optical system designed to generate at least one known optical aberration on a wavefront by means of a correction device according to the first aspect of the invention.

And according to a third aspect, the invention relates to the use of the deformation device according to the first aspect of the invention for polishing under constraints to generate complex aspherical mirrors benefiting from the excellent quality of spherical mirrors super-polished by a full-size tool (less than 10 nm rms of form error, less than 3 nm rms of local defects and less than 0.5 nm rms of roughness).

PRESENTATION OF FIGURES

Other characteristics and advantages of the invention will emerge from the following description which is purely illustrative and non-limiting and must be considered in light of the attached diagrams, in which.

DETAILED DESCRIPTION OF THE INVENTION

General Description of the Device

Figure 1:
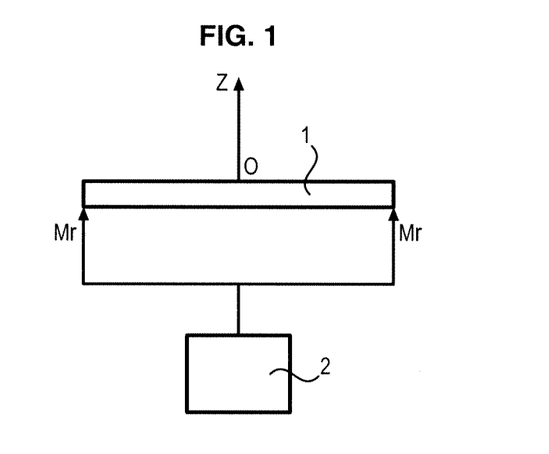
FIG. 1 schematically illustrates a correction device of at least one aberration according to the invention.
Figure 2:
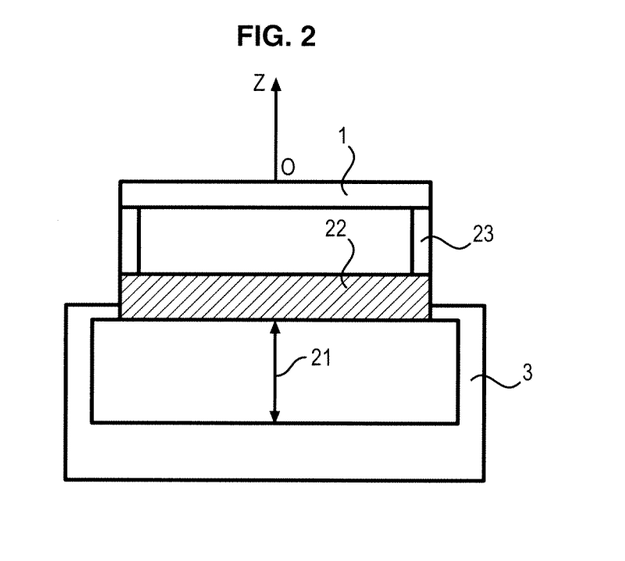
FIG. 2 schematically illustrates a correction device of at least one aberration according to an embodiment of the invention.

FIGS. 1 and 2 illustrate a device for correcting at least one optical aberration. Such a device is applied in optical instruments where the optical aberrations evolve in a known manner.

It is specified that known evolution refers to the fact that the evolution of the aberration is determined in advance as a function of the optical instrument.

Figure 3:
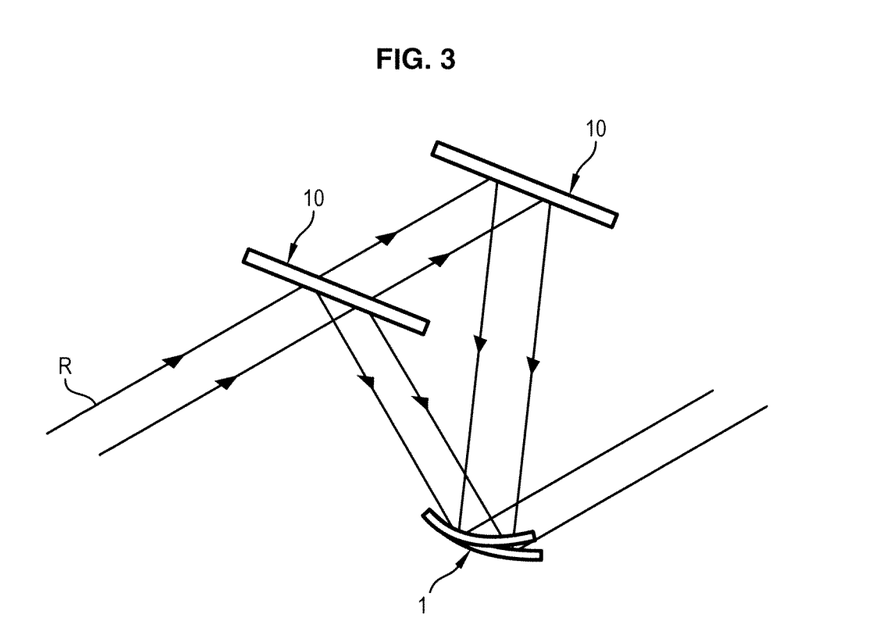
FIG. 3 illustrates an example of use of the correction device of at least one aberration according to the invention in an optical system.

An example of the use of a device for correcting at least one optical aberration such as illustrated schematically in FIGS. 1 and 2 is illustrated in FIG. 3.

A light beam R arrives with a non-zero angle of incidence on a deflecting mirror 10, generating defects in the wavefront (represented in dots in FIG. 3) which can be compensated further with a corrective mirror 1; if the position of the mirror 10 varies (between the two positions illustrated in FIG. 3), the aberrations to be compensated will also vary and the form of the mirror 1 must follow this evolution for best correcting the wavefront.

The corrective device, presented in FIG. 1, comprises a deformable mirror 1 having a contour and means 2 for deforming the mirror by applying moments of flexion to its edges.

The deformable mirror has a geometry adapted such that the contour of the mirror 1 is defined from a composite function of the aberrations to be corrected.

It is specified that here composite function means aberrations to be corrected, the sum of the optical modes considered. In fact, the error on the wavefront, and therefore the form of the mirror, z, can be expressed in the polar position $(\rho,\theta)$, as a sum weighted by optical aberrations, $Z_i$:

$$z(\rho,\theta)=\Sigma\alpha_i Z_i(\rho,\theta)$$

The means 2 for deforming the mirror are adapted to apply a flexing moment Mr on the edges of the mirror 1 by means of the application of force. The deformable mirror is concave or convex when it is deformed.

The device is founded on the hypothesis according to which the aberration or aberrations to be corrected are of known evolutions and on the hypothesis according to which the flexing moment can have the curve of the optical surface of the mirror 1 vary.

For example, in the case of an aberration of Focus type, the curve of the mirror is the same according to all directions.

It is of course possible to generate a variant curve with the orientation of the mirror, in this case, optical modes of higher orders are generated.

In fact, a thin circular plate, here the mirror 1, can be deformed into a curve (Focus) by applying a uniform moment distribution on its edges.

In this way, by combining a particular contour for the mirror 1 with distribution of particular moments it is possible to correct at least one known aberration (here a Focus).

This results in a device specially provided for compensating at least one aberration, of known evolution, merely by application of force generating moments on the edges of the mirror.

The mirror can be plane, concave or convex, and it can be made of glass or metal. Its thickness will depend on the amplitude of the preferred deformation and on the force available. Classically the mirror has a thickness of a few millimeters, typically between 2 and 10 mm.

The deformation system is metallic, and it can be of variable thickness, around a few tens of millimeters.

Contour

The contour of the mirror is deduced from a composite function of at least one aberration.

The composite function is defined in a position in cylindrical coordinates $F_O=(O,\vec{x}_O\vec{y}_O\vec{z}_O)$ attached to the mirror 1, of origin O the centre of symmetry of the mirror and $\vec{z}_O$ a vector parallel to the optical axis of the mirror.

In particular the contour of the mirror is such that the composite function is zero according to the axis z.

By way of example, an elliptical contour of the mirror 1 generates modulation of moments transmitted at the edge corresponding to deformation in Focus and Astigmatism.

The composite function in this case is expressed by $$z(\rho,\theta)=\alpha_{Foc}(2\rho^2-1)+\alpha_{Ast}\rho^2\cos(2\theta),$$

with z the deformation of the optical surface, $(\rho,\theta)$ the coordinates in the polar position defined hereinabove and $a_{Foc}$ and $a_{Ast}$ the amplitudes of the relevant aberrations.

With the hypothesis according to which the edges of the mirror 1 are fixed, the result is the expression of the contour, that is, of the radius at the edge, $\rho_b$ as a function of the angle $\theta$, which corresponds to the equation of an ellipse:

$$z(\rho_b,\theta)=0 \Rightarrow p_b(\theta)=\left(2+\frac{\alpha_{Ast}}{\alpha_{Foc}}\cos(2\theta)\right)^{-1/2},$$

with the same notations as earlier.

FIGS. 4a to 4f illustrate different contours corresponding to different composite functions, the curve 10 corresponds to a composite function dependent on a Focus alone, while the curve 20 corresponds to a composite function dependent on a Focus plus one or more other aberrations, as detailed hereinbelow.

Figure 4A:
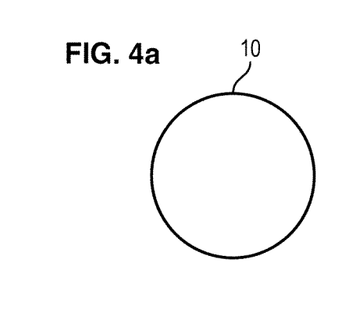
FIGS. 4a to 4f illustrate contours for different combinations of aberrations.
Figure 4B:
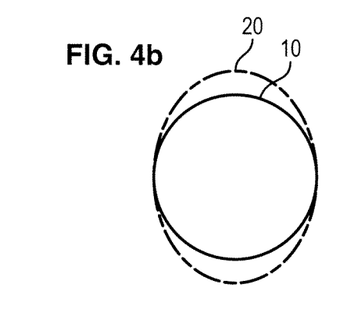

In FIG. 4a the contour corresponds to a composite function dependent on a Focus alone In FIG. 4b the contour corresponds to a composite function dependent on a Focus and an Astigmatism.

Figure 4C:
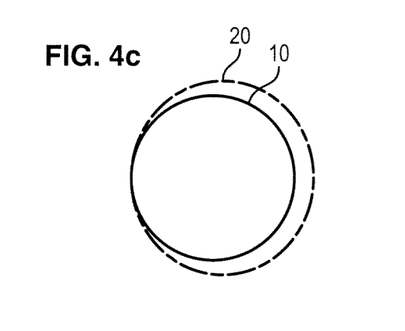

In FIG. 4c the contour corresponds to a composite function dependent on a Focus and a Coma.

Figure 4D:
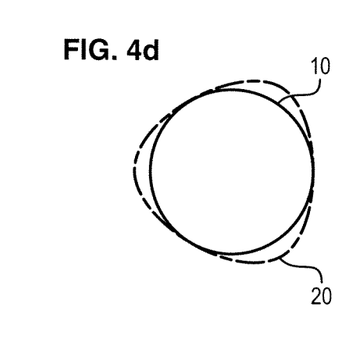

In FIG. 4d the contour corresponds to a composite function dependent on a Focus and a Trefoil.

Figure 4E:
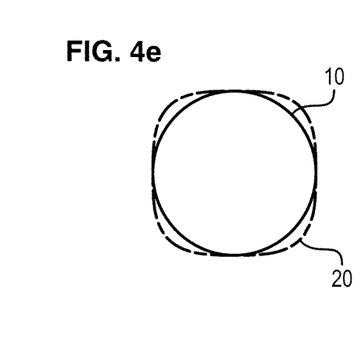

In FIG. 4e the contour corresponds to a composite function dependent on a Focus and a Tetrafoil.

Figure 4F:
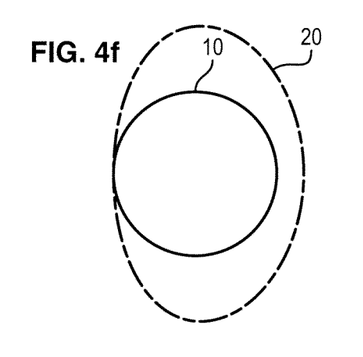

In FIG. 4f the contour corresponds to a composite function dependent on a Focus, an Astigmatism, a Coma and a Tilt.

Deformation System

According to a particular embodiment, illustrated in FIG. 2, the means 2 for deforming the mirror comprise:
- an intermediate plate 22 having a contour identical to that of the deformable mirror 1;
- a single actuator 21 applying a force F of given intensity on the intermediate plate 22;
- a ring 23 connecting the intermediate plate to the mirror (the ring is placed above the intermediate plate, the mirror being placed on the ring).

This configuration of the deformation means 2 creates a flexing moment on the edges of the intermediate plate 22 by application of force F in its centre.

In connecting the mirror to the intermediate plate, via a ring 23, the necessary moment is transmitted to the mirror and the latter is deformed.

The mirror plus deformation system assembly is maintained by an attaching system 3.

Generating the moment of force at the edge of the mirror 1 is simple and not complex and requires only a small number of mechanical pieces.

The thickness of the intermediate plate 22 is advantageously of the same order of magnitude as the thickness of the mirror and the thickness of the ring 23 is greater (typically the ring is 1.5 to 5 times thicker than the mirror). The entire deformation system is made of metal. These characteristics depend on the amplitude of the preferred deformation and will be defined according to the necessary rigidity.

The actuator 21 can be piezoelectric or of any other type for application of force on the intermediate plate.

To improve the quality of deformation of the mirror and consequently the precision of the correction of the aberration or the aberrations the intermediate plate 22 can be optimised.

In particular, thickness distribution can be added to the intermediate plate, calculated to transmit exactly the necessary moments.

Such distribution will be angular: the thickness at the edge of the intermediate plate depends on the angle θ.

Such thickness distribution can be obtained as follows.

The flexing moment at the edge of the mirror is directly given by its deformation, z:

$$M_{r,b}(\theta) = -D\left(\frac{\partial^2 z(r_b, \theta)}{\partial r_b(\theta)^2} + v\left(\frac{1}{r_b(\theta)}\frac{\partial z(r_b, \theta)}{\partial r_b(\theta)} + \frac{1}{r_b(\theta)^2}\frac{\partial^2 z(r_b, \theta)}{\partial \theta^2}\right)\right)$$

with $r_b$ the radius at the edge, given by the equation of the contour, dependent on θ

D is the rigidity of the material of the intermediate plate defined by $$D = \frac{Et^2}{12(1-v^2)}$$

with E the Young's modulus of the material, v Poisson's ratio of the material, and t the thickness of the mirror.

Now, central force, F, is applied to the intermediate plate, creating a moment at the edge of the plate which is transmitted to the at the edge of the mirror:

$$M_{r,b}(\theta) = F\rho_b(\theta) = F\frac{r_b(\theta)}{a}$$

Equalising the two expressions results, for a given deformation, in a relation between thickness and rayon at the edge of the intermediate plate:

$$t_b(\theta) = \left[\frac{\frac{12(1-v^2)F}{E}\frac{r_b(\theta)}{a}}{\left(\frac{\partial^2 z(r_b, \theta)}{\partial r_b(\theta)^2} + v\left(\frac{1}{r_b(\theta)}\frac{\partial z(r_b, \theta)}{\partial r_b(\theta)} + \frac{1}{r_b(\theta)^2}\frac{\partial^2 z(r_b, \theta)}{\partial \theta^2}\right)\right)^{-1}}\right]^{1/2}$$

So, for given deformation and contour, the thickness distribution at the edge of the intermediate plate 22 generates the necessary moments which can be calculated.

Decentring of Force

To further improve the quality of the deformation of the mirror on the point of application force on the intermediate plate can also be shifted.

In fact, the moment transmitted depends on the distance between the point of application of the force and the edge of the intermediate plate.

By way of example the aberrations Tip/Tilt and Coma can be generated by offsetting the position of the actuator relative to the centre.

For a force F offset by $(x_d, y_d)$ relative to the centre there will therefore by new modulation of the induced moment:

$$M_{r,b}(\theta) = Fr'_b(\theta)$$

$$= F\sqrt{r_b(\theta)^2 + x_d^2 + y_d^2 - 2r_b(\theta)(x_d\cos(\theta) + y_d\sin(\theta))}$$

With $r_b(\theta)$ the distance between the centre and the edge of the plate and $r'_b(\theta)$ the distance between the point of application of the force F and the edge of the plate.

The appearance of the terms in cos(θ) and sin(θ) in the expression of the moment correspond to the terms of Tip/Tilt and Coma. Accordingly, when the force on the system is simply offset, the generation of these modes can be added, their amplitudes depending on the offset distance.

So as not to degrade the quality of other preferred modes, the thickness distribution can be recalculated, in the same way as before by taking into account the new expression of the moment (Frby'(θ) rather than Frb(θ)).

By decentring the force on an elliptical system and by modifying the thickness distribution, Tilt and Coma are added to the deformation of the mirror. The precision of generation is excellent: around 0.4%

As a consequence, as a function of the precision required for correction a device is used comprising several geometric parameters to define the deformation of the mirror.

Figure 5A:
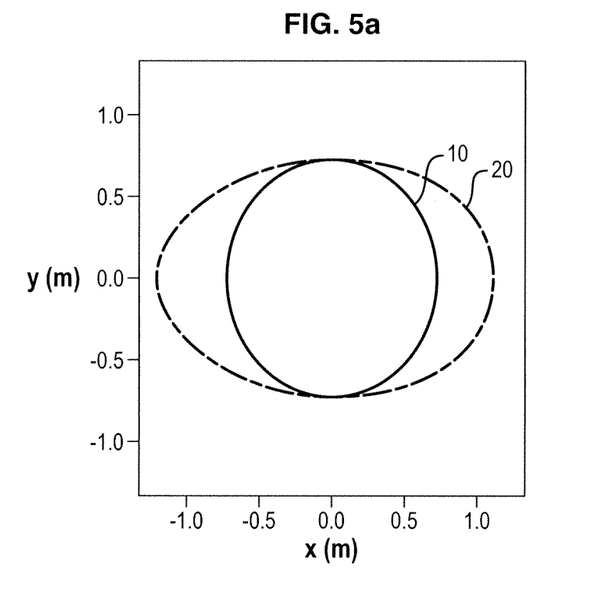
FIGS. 5a to 5c illustrate an example of use of the device according to the invention for generating a particular combination of aberrations.
Figure 5B:
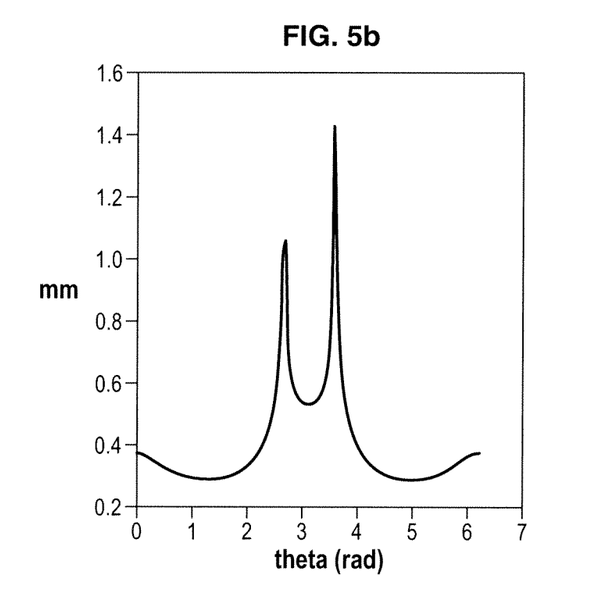
Figure 5C:
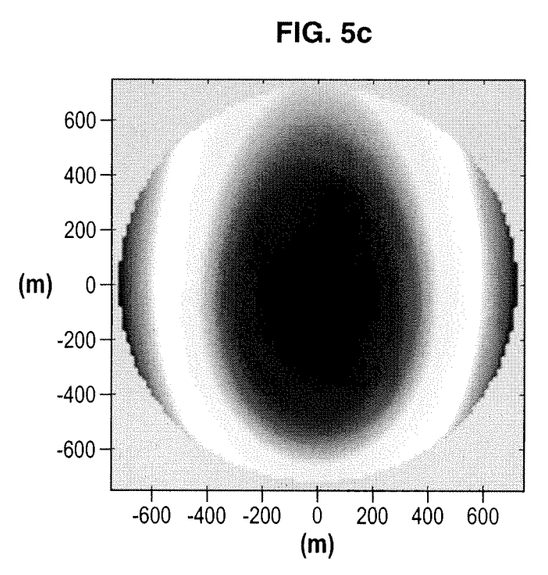

FIGS. 5a to 5c illustrate an example of application. The contour of the mirror and of the intermediate plate have a contour 20 and the intermediate plate has a distribution of thickness such as illustrated in FIG. 5b. The application of force, via an actuator, at the centre of the intermediate plate deforms the optical surface circular according to a sum of Focus, Astigmatism and Coma. FIG. 5c illustrates the resulting deformation. In this figure the further away from the edge the less the mirror is deformed.

Such a device can be, for example, integrated in an interferometer for correcting non-common aberrations between the two paths of the interferometer. This deformation system can also be coupled to the technique of polishing under constraints to obtain aspherical mirrors of very good optical quality.

The invention claimed is:

1. A device for correcting at least one optical aberration, of known evolution of an optical system, the device comprising:
   a deformable mirror having a contour and geometry selected such that the contour of the mirror is defined from a composite function of said at least one optical aberration to be corrected;
   an intermediate plate having a contour identical to that of the mirror;
   a single actuator, placed under the intermediate plate and configured to apply a force F of a given intensity in the centre of an under part of the intermediate plate;
   a ring placed above the intermediate plate, the mirror being placed on the ring;
   wherein the intermediate plate is connected to the deformable mirror by the ring, said intermediate plate being configured for applying via the ring a flexing moment on an edge of the mirror, the deformable mirror being concave or convex when it is deformed,
   wherein the composite function is defined in a position in cylindrical coordinates $F_O=(O,\vec{x}_O,\vec{y}_O,\vec{z}_O)$ attached to the mirror, of origin O the centre of symmetry of the mirror and with $\vec{z}_O$ a vector parallel to the optical axis of the mirror, the contour being such that the composite function is zero according to the axis z, and the contour of the mirror generates modulation of moments transmitted at the edge corresponding to deformation in focus and astigmatism, and the composite function has the formula $$z(\rho,\theta)=\alpha_{Foc}(2\rho^2-1)+\alpha_{Ast}\rho^2\cos(2\theta),$$

with z the deformation of the optical surface, $(\rho,\theta)$ the coordinates in the polar position and $a_{Foc}$ and $a_{Ast}$ the amplitudes of the optical aberrations.

2. The device as claimed in claim 1, in which the contour is selected from the following group:
   circular if the composite function is composed by a focus;
   elliptical if the composite function is composed by a focus and an astigmatism;
   a form defined by the resolution of the composite function composed by a focus and one or more other aberrations.

3. The device as claimed in claim 2, in which the single actuator is positioned to apply the force F at the centre of the intermediate plate.

4. The device as claimed in claim 3, in which the deformable mirror is of variable thickness.

5. The device as claimed in claim 4, in which the intermediate plate has an edge of variable thickness.

6. The device as claimed in claim 5, in which the mirror is constituted by at least one of glass and metal.

7. An optical observation system designed to generate at least one known optical aberration on a wavefront comprising a correction device as claimed in claim 6.

8. Use of the deformation device as claimed in claim 5, for the polishing under constraints for generating mirrors having less than 10 nm rms of form error, less than 3 nm rms of local defects and less than 0.5 nm rms of roughness.

* * * * *

UNITED STATES PATENT AND TRADEMARK OFFICE
CERTIFICATE OF CORRECTION

PATENT NO. : 9,097,886 B2
APPLICATION NO. : 13/450385
DATED : August 4, 2015
INVENTOR(S) : Marie Laslandes et al.

Page 1 of 1

It is certified that error appears in the above-identified patent and that said Letters Patent is hereby corrected as shown below:

In the Claims,

Column 7, Claim 1, at line 31, please delete "$F_O=(O, \vec{x}_O, \vec{y}_O, \vec{z}_O)$" and insert --$F_O = (O, \vec{x}_O, \vec{y}_O, \vec{z}_O)$--.

Signed and Sealed this
Fifteenth Day of March, 2016

Michelle K. Lee
*Director of the United States Patent and Trademark Office*